Feb. 27, 1923.

F. C. SMITH.
EDUCATIONAL DEVICE.
FILED JUNE 20, 1921.

1,446,941.

Inventor:
FRANK C. SMITH.
By Hazard & Miller
Attorneys

Patented Feb. 27, 1923.

1,446,941

UNITED STATES PATENT OFFICE.

FRANK C. SMITH, OF LOS ANGELES, CALIFORNIA.

EDUCATIONAL DEVICE.

Application filed June 20, 1921. Serial No. 479,005.

*To all whom it may concern:*

Be it known that I, FRANK C. SMITH, a citizen of the United States, residing at Los Angeles, in the county of Los Angeles and State of California, have invented new and useful Improvements in Educational Devices, of which the following is a specification.

My invention relates to an educational device that is particularly adapted for use in the arts of design, that is, those arts which enter into the study and designing of artistic forms and figures, the principal object of my invention being to provide a relatively simple and practical device which, in addition to being of material assistance in the study of sculpture carving, engraving, architecture, painting and similar arts, provides a novel, pleasing and entertaining pastime, particularly for young people and children.

With the foregoing and other objects in view, my invention consists in certain novel features of construction and arrangement of parts that will be hereinafter more fully described and claimed, and illustrated in the accompanying drawings, in which:

Figure 1:
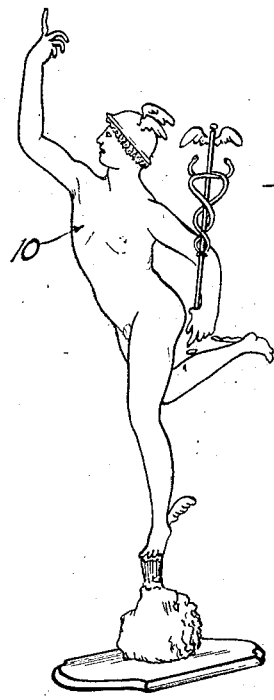
Fig. 1 is a perspective view of an artistic figure that is adapted to be used as a part of my improved educational device, and which is also adapted for use as a guide for the student or person that is making use of my improved device.
Figure 2:
Fig. 2 is a perspective view of the complete device with a portion thereof broken away to expose the artistic figure that is being developed and studied by the student or user of the device.

The educational device contemplated by my invention includes an object, of artistic nature, for instance a statuette 10, or a replica of some well known statue. This object is preferably formed of material that cannot be easily broken: for instance, said object might be formed of wood, fiber composition, papier mâché, metal, or the like, and this object is wholly imbedded in a body 11 of readily chippable material such as plaster of Paris, chalk, clay, or putty, in fact any material that is capable of being broken away in small pieces, or chipped off by the use of tools such as a hammer or mallet and chisel.

The device thus formed, and comprising the body of readily chippable material with the object wholly imbedded therein, is delivered to the student or person engaged in the study of art or design, and by suitable tools such as a chisel or hammer and mallet, the readily frangible body is chipped or broken away in small pieces until the imbedded figure 10 is fully exposed; and during these operations the student or person engaged in the work not only gains knowledge in the art of sculpture, but has continually before him the gradually developing figure of the imbedded object and therefore is able to study in detail the form and proportions of the artistic figure.

Obviously, my improved educational device may include any artistic object, for instance the statuette of a human figure, the figure of an animal, or a plate or panel upon which appears in relief or intaglio, the representation of some well known painting, carving, engraving or architectural structure.

In addition to providing a device that is of material assistance in the study of sculpture, carving, engraving, architecture, painting and the like, the device may provide a pleasing pastime for children by providing chippable blocks having toy figures imbedded therein and which latter are brought to view by a gradual breaking or chipping away of the frangible body in the manner above set forth.

In order to enhance the value of my improved device as a study of artistic forms and figures, the student when given one of the chippable blocks with an object imbedded therein, may also be given a duplicate object, or a picture of said object by itself and, by observing this duplicate object or picture, the person engaged in chipping or breaking the frangible material away from the embedded object, may study the form and location of the various parts of the subject, and thereby gain a thorough knowledge of the artistic features thereof.

In some instances, it may be found desirable to form the imbedded object from material that has practically the same degree of frangibility as the material in which it is imbedded, and where such construction is employed, the person engaged in breaking or chipping away the inclosing body of material must necessarily use extreme care in the breaking or chipping operations to refrain from breaking or chipping away parts of said imbedded object.

An educational device of my improved construction is comparatively simple, may be easily and cheaply produced, and provides practical means for the study of the arts, such as sculpture, engraving, carving and the like, as well as providing a pleasing and instructive pastime for young people.

I claim as my invention:

1. An educational device comprising an opaque body of chippable material, and an artistic body embedded in the first body.

2. An educational device comprising an opaque body of chippable material and an artistic body embedded in the first body and of a material relatively non-chippable.

3. An educational device comprising an opaque body of chippable material, and an artistic body embedded in the first body and of a frangible material.

4. An educational device comprising an artistic body, and an encasing body for the artistic body formed of a material which is readily chippable so that the artistic body can be gradually exposed to view without detriment thereto when chipping the encasing body.

5. An educational device comprising an artistic body, and a body of chippable opaque material encasing the first body.

In testimony whereof I have signed my name to this specification.

FRANK C. SMITH.